United States Patent
Roobrouck et al.

(10) Patent No.: US 6,272,585 B1
(45) Date of Patent: Aug. 7, 2001

(54) MULTIPLE INTERRUPT HANDLING METHOD AND APPARATUS

(75) Inventors: Pascal Roobrouck, Antwerp; Jozef Albert Octaaf Goubert, Baasrode, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/088,232

(22) Filed: Jun. 1, 1998

(30) Foreign Application Priority Data

Jun. 13, 1997 (EP) .................................. 97401339

(51) Int. Cl.$^7$ ...................................... G06F 13/24
(52) U.S. Cl. ................... 710/260; 710/262; 710/263; 710/266
(58) Field of Search .................. 712/1; 710/260, 710/261, 264, 263, 262, 265, 266, 267, 268, 289

(56) References Cited

U.S. PATENT DOCUMENTS

| | | |
|---|---|---|
| 4,488,220 | 12/1984 | Friedli et al. . |
| 4,626,987 * | 12/1986 | Renninger ............................. 710/262 |
| 4,819,173 * | 4/1989 | Brauninger ............................. 701/110 |
| 5,146,595 | 9/1992 | Fujiyama et al. ..................... 395/725 |
| 5,226,150 * | 7/1993 | Callander et al. ..................... 714/57 |
| 5,410,708 | 4/1995 | Miyamori ............................. 395/725 |
| 5,628,018 | 5/1997 | Matsuzaki et al. .................. 395/733 |
| 5,689,713 * | 11/1997 | Normoyle et al. ................... 710/263 |
| 5,822,595 * | 10/1998 | Hu ........................................ 710/264 |

FOREIGN PATENT DOCUMENTS

| | | |
|---|---|---|
| 195 20 771 | 12/1995 | (DE) . |
| 0062141 | 10/1982 | (EP) . |
| 0316138 | 5/1989 | (EP) . |
| 0469543 | 7/1991 | (EP) . |
| 0468454 | 1/1992 | (EP) . |
| 0652514 | 5/1995 | (EP) . |

\* cited by examiner

*Primary Examiner*—Richard Hjerpe
*Assistant Examiner*—Mackly Monestime
(74) *Attorney, Agent, or Firm*—Ware, Fressola, Van Der Sluys & Adolphson LLP

(57) ABSTRACT

A method and an apparatus for handling interrupt requests generated by a plurality of interrupt sources (2A, 2N) for a processor. The method includes steps of scanning interrupt registering means (8) for determining a current interrupt request to be sent to the processor among interrupt requests having respective interrupt flags inputted in said interrupt registering means, and steps involving the processor for execution of an interrupt processing program according to the result of a comparison of a scanned interrupt flag with a predetermined flag value, characterised in that it includes a step of latching a flag corresponding to a first occurring interrupt request from a source in a group of sources into interrupt latch registering means (7) for further processing and for blocking further interrupt requests from at least the same source in the same group from having a flag latched before processor controlled resetting.

9 Claims, 1 Drawing Sheet

MULTIPLE INTERRUPT HANDLING METHOD AND APPARATUS

BACKGROUND OF THE INVENTION

1. Field of the Invention

The present invention relates to a multiple interrupt handling method and to a corresponding apparatus, more particularly for handling a multiplicity of interrupt requests sent from a multiplicity of interrupt sources to a microprocessor, for instance in a processing unit of a telecommunication system.

2. Background of the Invention

A known method for taking account of an occurring event to be processed by means of a processor requires an interrupt request of the operation then processed to have it restarted later from the stop point as soon as possible after the event accounting.

However such a method does not fit well when there is a need for multiple interrupt handling by means of a same microprocessor as required in some processing systems, knowing that only one interrupt is processed at a time. European Patent Application 0 469 543 relates to a multiple interrupt handling circuit allowing a multiplicity of interrupt requests to be handled without exception in a processor controlled system. The circuit comprises interrupt selecting means associated with interrupt flag registering means and with latching means. It selects one interrupt request among several others simultaneously present for immediate transmission to the processor.

However, in some systems and more specifically real-time handling systems as found in telecommunication, there is a possibility of different interrupt types and/or of a large number of interrupt sources. Handling all interrupt requests would require excessive processing time and/or equipment with the known methods and apparatuses. Such a handling is even useless when the interrupt causes are either redundant or no more significant as it happens in systems, such as alarm systems in which several monitored consequences are often driven from a same action.

SUMMARY OF THE INVENTION

The object of the present invention is to provide a method for handling interrupt requests generated by a plurality of interrupt sources in a system with a processor, said method including steps of scanning interrupt registering means for determining a current interrupt request to be sent to the processor among interrupt requests having respective interrupt flags inputted in said interrupt registering means, and steps involving the processor for execution of an interrupt processing program according to the result of a comparison of a scanned interrupt flag with a predetermined flag value.

According to the invention, the method includes a step of latching a flag corresponding to a first occurring interrupt request from a source in a group of sources into interrupt latch registering means for further processing and for blocking further interrupt requests from at least the same source in the same group from having a flag latched before processor controlled resetting, this latching step being performed for each other scanned interrupt flag from a different source of a same or different group of sources, upon termination of the interrupt processing program for the interrupt currently in process.

According to the invention, the method also includes a step of comparing the current state for an interrupt source with a previously recorded state for the same interrupt source for generating an interrupt request if and only if the compared states are different Another object of the present invention is to provide an apparatus for handling interrupt requests generated by a plurality of interrupt sources, said apparatus including means associated with a processor for initiating and executing an interrupt processing program, said means including interrupt flag registering means selecting one current interrupt from a source to be transmitted to the processor among several other current interrupts from other sources.

According to the invention, the apparatus includes latch registering means receiving a first occurring interrupt from a source included in a group of sources and blocking further interrupts from at least the same source in the same group from being latched before processor controlled resetting, said latch registering means including a number of individual latch registering units for interrupt flags far smaller than the number of interrupt sources connected.

According to the invention, the apparatus also includes state recording means associated with sources and comparing means for providing an interrupt request when a current state for a source differs from the state previously recorded for the same source.

BRIEF DESCRIPTION OF THE DRAWINGS

These and other objects, advantages and features of the invention will become apparent from the following description thereof taken in conjunction with the accompanying drawings which illustrate a specific embodiment of the present invention.

The unique

DESCRIPTION OF THE PREFERRED EMBODIMENT

Figure 1:
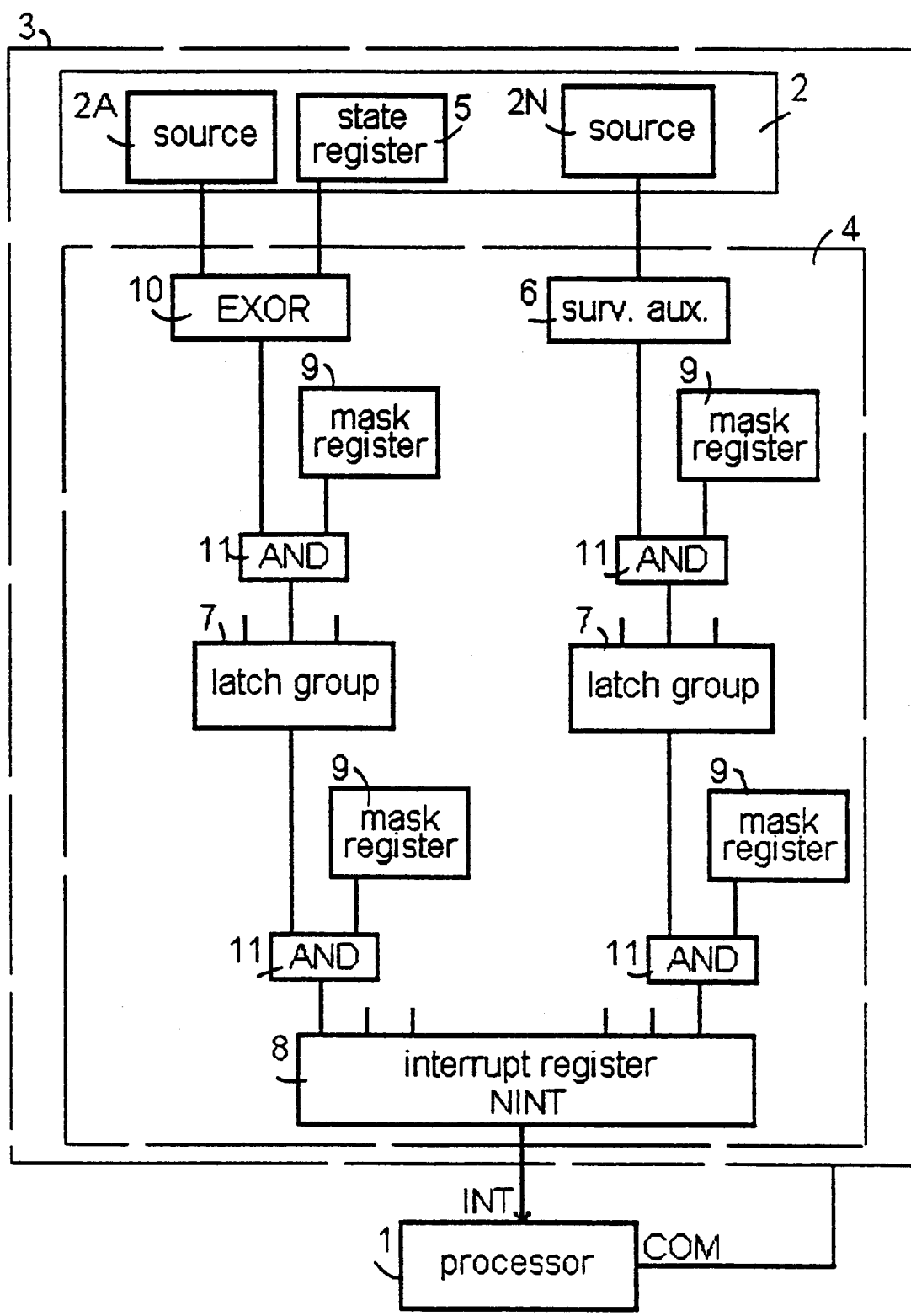
FIG. 1 is a block diagram of a system including a processor, a multiplicity of interrupt sources and a multiple interrupt handling apparatus in accordance with the present invention.

FIG. 1 shows a system including a processor 1 and a set 2 of interrupt sources, such as 2A, 2B, . . . 2N, of a multiple interrupt handling apparatus 3. Such a system comprises for instance more than one thousand interrupt sources providing different types of interrupt request to a same processor 1, as foreseen for instance in an alarm and events handling structure of a telecommunication switching unit.

In a preferred form of realization, state recording means 5 are associated with the majority of sources, if not all in order to generate an interrupt request after comparison of the current state of the source with the previously recorded state for the same source in order to avoid sending an interrupt request when these two states are or are again identical.

This is implemented with sources, here referred to as sources of a first category c1, generating an interrupt request when there is a change from one value to another among several predefined values for a monitored signal, as illustrated by source 2A.

There is also a possibility of other sources, such as 2N, generating an interrupt request as soon as a counting or counting down of events, for instance from one or from another determined number of events, is reached or as soon as a persistency or non-persistency of events is detected, for instance three events by hour. Auxiliary surveying means 6 for instance counters, are associated to such sources as illustrated on FIG. 1.

The requests from all the sources of set 2 are transmitted by means of interrupt flags to a handling apparatus unit 4 for further transmission to the processor 1.

This last is associated with memories, auxiliaries and with at least a time base, as known in the art. It receives the interrupt signal referenced NINT coming from the handling apparatus unit 4 by means of an interrupt input INT and it communicates with the handling apparatus unit 4 and with the sources by means of at least one communication port COM.

Identical or similar interrupt sources generating interrupt requests of same or compatible types are associated together in order to send their respective interrupt flags to a same group of latch registering means with far less registering capacity than normally required with the number of associated sources. There are for instance individual latch registering units for five interrupt flags in a group of latch registering means associated with one thousand identical or similar interrupt sources, for instance in every group of latch registering means 7A, 7N respectively associated with a group of sources including source 2A and with another group of sources including source 2N.

When interrupt flags are sent by identical or similar interrupt sources to a same group of latch registering means, such as 7A, they are inputted if there is any room for them, and no other interrupt flag is taken in account at the level of this group as soon and as long as it is full.

Usual interrupt registering means 8 are connected to the outputs of every group of latch registering means and their is a transmission one by one of the interrupt flags recorded at the level of a group.

The handling method starts with generation of interrupt flags by interrupt sources. A selective step of interrupt flag storage in latch registering means is then implemented. It starts as soon as a first occurring interrupt flag is received from a source in a restricted group of latch registering means, and stops for such a group as soon as there is no more room in the group for a newly occurring interrupt flag and as long as there is no latched interrupt flag from this group processed by the processor and disappearing from the latch registering means after such a processing.

The interrupt flags inputted into a group of latch registering means are also inputted into interrupt registering means as soon as there is no masking imposed on them.

As known in the Art, masking means, such as mask registers 9, are associated for instance to every group of latch registering means and/or to registering means in order to block further transmission of interrupt flags to the output of such latch registering and/or registering means from selected ones of their respective inputs.

The interrupt flags inputted into the interrupt registering means, at the highest level of registering means hierarchy if they are more than one level, are then scanned in an usual way in order to determine a current interrupt to be sent to the processor.

A new opportunity for inputting an interrupt flag in an already full group of latch recording means is offered when there is an interrupt processed.

According to the invention, all the interrupt flags generated by sources and not yet inputted in a group of latch registering means are considered as transient events.

If there is a new change of state for a source of category c1 driving it to its previous state, the corresponding interrupt is then considered as really transient and does not need any processing.

If there is no change of state of a source or no provision for recording such a change associated with a source, the corresponding interrupt flag remains stored as long as it is not handled, i.e. further transmitted or masked. When the number of interrupt sources is large, as foreseen above; the register means are often staggered for concentration purposes when the kind of at least some interrupts allows such a concentration.

As indicated before, every interrupt source such as 2A, 2N can trigger the interrupt signal NINT to the processor and generates accordingly interrupt flags, for instance one bit interrupt flags, that it sends to the interrupt handling apparatus.

If an interrupt is to be sent, for instance by source 2A, a comparison is made between the current state of this source with the previous state recorded by an unit of state recording means 5, for instance a state register and there is an interrupt flag for an interrupt request sent if and only if the compared states are not the same.

Such a state register is for instance an alarm state register shared by a plurality of identical or similar sources having their respective interrupt outputs connected to a same unit of interrupt registering means 8.

An EXOR circuit 10 acting as a comparator is shown associated to source 2A and to the associated unit of state recording means 5 on the FIG. 1.

To prevent an useless overloading of the processor by a steady flow of interrupt requests, elimination of redundant and insignificant interrupt requests in a given context is organized as already indicated above.

As indicated above masking means, such as mask registers 9 are associated with the latch registering means 7 and with the interrupt registering means 8.

Interrupt mask register means are for instance associated to every main interrupt register and/or possibly to other interrupt registers with high levels in the hierarchy of the handling apparatus, if any.

Each interrupt mask register 9 has a same interrupt flag arrangement as the associated latch register, interrupt register or interrupt register part and masks a source request by forcing the corresponding interrupt flag to a predetermined and ineffective value of masking, for instance a binary 1 value for a one bit interrupt flag. There is no input in an interrupt register of an interrupt flag subjected to a masking action.

Such an arrangement is shown on FIG.1 where there are two interrupt mask register 9 associated with main interrupt register 8. Each of these two interrupt mask registers are under control of the processor and blocks at least some inputs of main interrupt register 8 when required. Such a blocking is for instance obtained by action of a masking value from an interrupt mask register 9 on an input of one of several AND logical circuits 11, each of said circuits 11 having an output connected to an individual input of the main interrupt register 8 and receiving interrupt flags on at least one other input from a group of latch registering means 7. For the same purpose, inputs of every group of latch registering means 7 are connected by means of AND logical circuits 11 to interrupt mask registers 9 and to the interrupt outputs of the sources through either EXOR circuits 10 or auxiliary surveying means 6.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for handling interrupt requests generated by a plurality of interrupt sources (2A, 2N) in a system with a processor (1), said method including the steps of scanning interrupt registering means (8) for determining a current interrupt request to be sent to the processor among interrupt requests having respective interrupt flags inputted in said interrupt registering means (8), and steps involving the processor for execution of an interrupt processing program according to the result of a comparison of a scanned interrupt flag with a predetermined flag value, characterised in that said interrupt registering means (8) is connected to a plurality of interrupt latch registering means (7) for processing interrupt requests therefrom, and said method further includes the step of latching a flag corresponding to a first occurring interrupt request from a source in a group of sources into one of said plurality of interrupt latch registering means (7) for further processing and for blocking further interrupt requests from at least one other source or the same source in the same group from having a flag latched before processor controlled resetting, wherein this latching step is performed for each other scanned interrupt flag from a different source of a different group of sources, upon termination of the interrupt processing program for the interrupt currently in process, and wherein the number of interrupt latch registering means (7) is smaller than the number of interrupt sources (2A, 2N).

2. A method as set forth in claim 1 further comprising a step of comparing the current state for an interrupt source with a previously recorded state for the same interrupt source for generating an interrupt request if and only if the compared states are different.

3. Apparatus for handling interrupt requests generated by a set (2) of interrupt sources, said apparatus including means (4) associated with a processor (1) for initiating and executing an interrupt processing program, said means (4) including interrupt flag registering means (8) for selecting one current interrupt request from a source to be transmitted to the processor among several other current interrupt requests from other sources, characterised in that said means (4) further includes a plurality of latch registering means (7) for receiving a first occurring interrupt request from a source included in a group of sources and blocking further interrupt requests from at least one other source or the same source in the same group from being latched before processor controlled resetting, wherein said interrupt flag registering means (8) is connected to said plurality of latch registering means (7) for processing interrupt requests therefrom and said latch registering means (7) includes a number of individual latch registering units for interrupt flags smaller than the number of interrupt sources connected.

4. Apparatus as set forth in claim 3, wherein state recording means (5) are associated with sources and comparing means for providing an interrupt request when a current state for a source differs from the state previously recorded for the same source.

5. Apparatus as set forth in claim 3, wherein auxiliary counting means (6) are associated with sources for providing an interrupt request when there is a predetermined value change for a signal monitored by one of these sources.

6. Apparatus as set forth in claim 3, further comprising masking means (9) associated with the latch registering means for limitation of the number of sources competing for interrupt flag introduction.

7. Apparatus as set forth in claim 4, wherein auxiliary counting means (6) are associated with sources for providing an interrupt request when there is a predetermined value change for a signal monitored by one of these sources.

8. Apparatus as set forth in claim 4, further comprising masking means (9) associated with the latch registering means for limitation of the number of sources competing for interrupt flag introduction.

9. Apparatus as set forth in claim 5, further comprising masking means (9) associated with the latch registering means for limitation of the number of sources competing for interrupt flag introduction.

* * * * *